United States Patent [19]
Prazmowski

[11] Patent Number: 5,609,753
[45] Date of Patent: Mar. 11, 1997

[54] BIOFILTER

[76] Inventor: B. Donald Prazmowski, 3400 Riverspray Crescent, Suite 506, Mississauga, Ontario, Canada, L4Y 3M5

[21] Appl. No.: 534,257

[22] Filed: Sep. 26, 1995

[30] Foreign Application Priority Data

Jun. 21, 1995 [PL] Poland .................................. 308989

[51] Int. Cl.⁶ .............................................. B01D 35/027
[52] U.S. Cl. ....................... 210/150; 210/151; 435/297.1; 435/299.1
[58] Field of Search ................................ 210/150, 151; 435/297.1, 299.1

[56] References Cited

U.S. PATENT DOCUMENTS

| | | | |
|---|---|---|---|
| 4,670,149 | 6/1987 | Francis | 210/150 |
| 4,680,111 | 7/1987 | Ueda | 210/150 |
| 4,908,128 | 3/1990 | Chiba | 210/150 |
| 4,985,182 | 1/1991 | Basse et al. | 210/150 |
| 5,168,058 | 12/1992 | Bohak et al. | 210/150 |
| 5,194,231 | 3/1993 | Gough et al. | 210/150 |
| 5,256,570 | 10/1993 | Clyde | 210/150 |

FOREIGN PATENT DOCUMENTS

| | | | |
|---|---|---|---|
| 1030697 | 2/1989 | Japan | 210/150 |
| 1171692 | 7/1989 | Japan | 210/150 |

*Primary Examiner*—W. L. Walker
*Attorney, Agent, or Firm*—Ice Miller Donadio & Ryan; Paul B. Overhauser; Doreen J. Gridley

[57] ABSTRACT

A biofilter has a plurality of filter elements each of which has a filter medium of fragmented plastic, preferably waste plastic. The fragmented plastic has an inherent curvature to maintain adjacent surfaces of the fragment plastic in spaced relationship. The filter elements are arranged in filter modules in series with the effluent flow with the longitudinal axes of filter elements of adjacent filter modules disposed orthogonally.

25 Claims, 7 Drawing Sheets

BIOFILTER

The present invention relates to a filter for use in the biological treatment of water in both aerobic and anaerobic conditions.

The oldest well-known biofilters applied widely in water treatment include biofilters made of natural materials, such as sand, gravel, or properly granulated basalt or granite stones. Biofilters have also been filled with other natural materials, such as blast-furnace coke or slag.

Another form of biofilter is a biochemical reactor, in which biologically active material is situated upon a spatially developed filter medium. These have also been used in water treatment. In one embodiment a filter medium is made of porous blocks of thin shaped plastic boards glued together. The blocks, placed in layers on a grid within the biochemical reactor (biofilter) serve as a base for a layer of micro-organism which take part in decomposition and synthesis of chemical compounds.

Other extensively used biofilters are filled with rings, balls or other geometrically shaped elements made of ceramic materials or plastic. Floating fibres, coils, tapes and nets made of plastic have also been used as biofilter fillings.

The previously known biofilters, as a result of the growth of microorganisms and biodegradation, become excessively polluted and have to be cleaned or replaced after a specific period of time. This task is difficult and expensive, and requires a temporal shut-down of the water treatment plant.

Water treatment plants have been usually built as stationary units with biofilters of specific, invariable dimensions. This narrows the possibility to choose a water treatment plant according to the specific needs of recipients. Such water treatment plants are generally uneconomical as far as their size and adjustment to individual needs are concerned.

It is therefore an object of the present invention to provide a filter that obviates or mitigates the above disadvantages.

In general terms, the present invention provides a filter that includes filter elements formed from non-oriented plastic strips made of fragmented, preferably cut, waste plastic products with a surface which constitutes a base for a layer of micro-organisms. The strips are used as a filling that is located within flexible inelastic sleeves that may be flexed to adapt to a cuboidal, preferably cubic configuration. A filter can contain any number of such identical filter elements assembled into modules that form a stiff, light weight structure.

It has been found that the plastic strips may readily provide a surface area of between 60 ft$^2$ and 90 ft$^2$ for each 1 ft$^3$ of filter to permit effective aerobic or anaerobic operation.

In the preferred embodiment of the invention, the utilization of fragmented waste plastic products reduces the production costs of the biofilter, and at the same time, if such biological reactors are widely used, it will help protect the natural environment through plastic waste disposal. Placing the filter elements in modules permits the construction of biofilters suitable in size to the amount of filtered water. This enables one to choose the dimensions of a water treatment plant according to individual requirements.

A biofilter built of modules as described in the preferred embodiment can serve as a submerged ("wet") or washed ("dry") biofilter and can be used in both aerobic and anaerobic treatment methods. This arrangement also facilitates construction from separate containers that can be easily replaced when, due to the growth of micro-organisms on the specific surface and biodegradation, they become excessively polluted.

The construction of a biofilter according to the preferred embodiment requires relatively small investment and provides low operating costs of treatment plants.

An embodiment of the invention will now be described by way of example only with reference to the accompanying drawings, in which.

Figure 1:
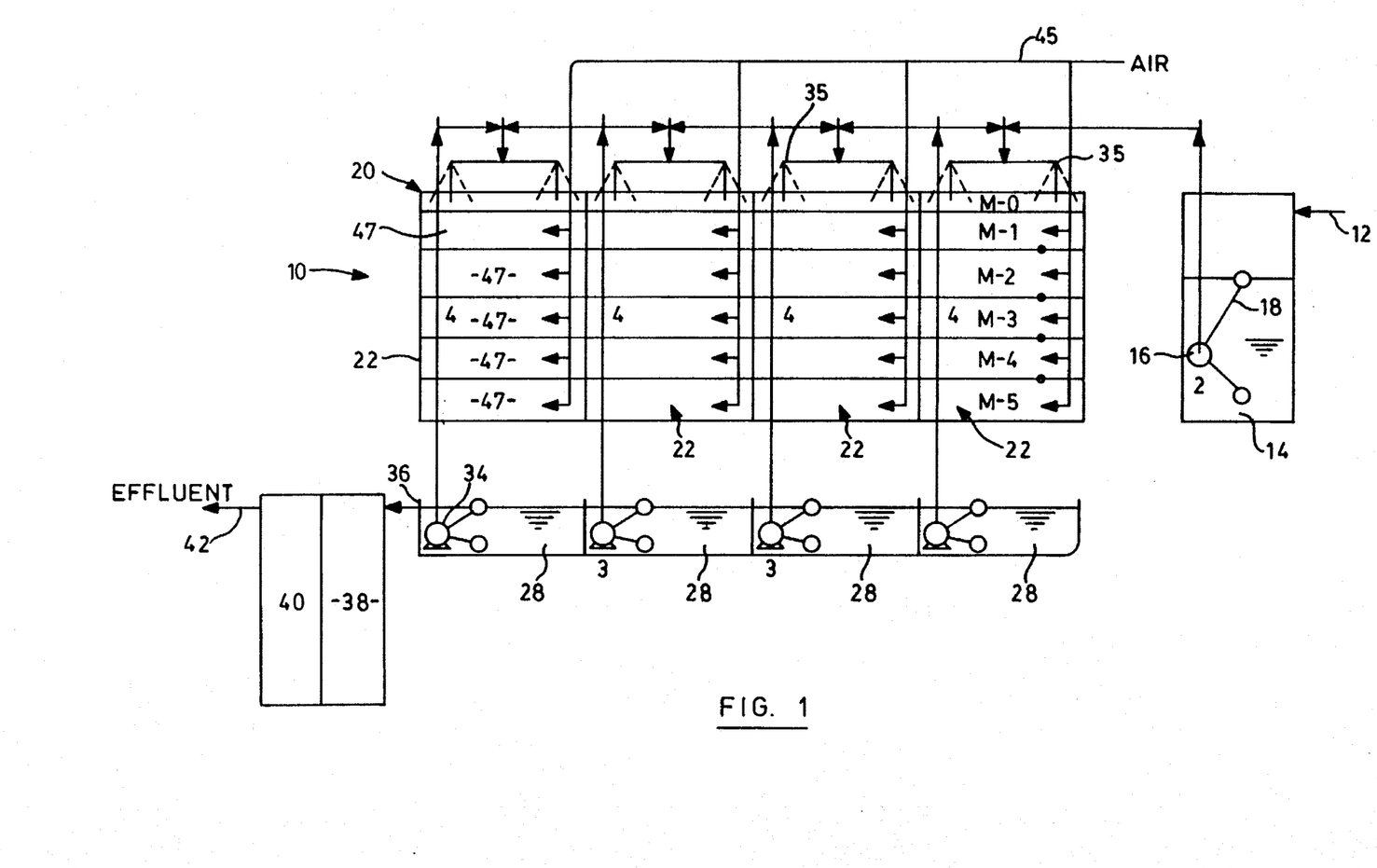
FIG. 1 is a schematic representation of a waste water treatment system.
Figure 2:
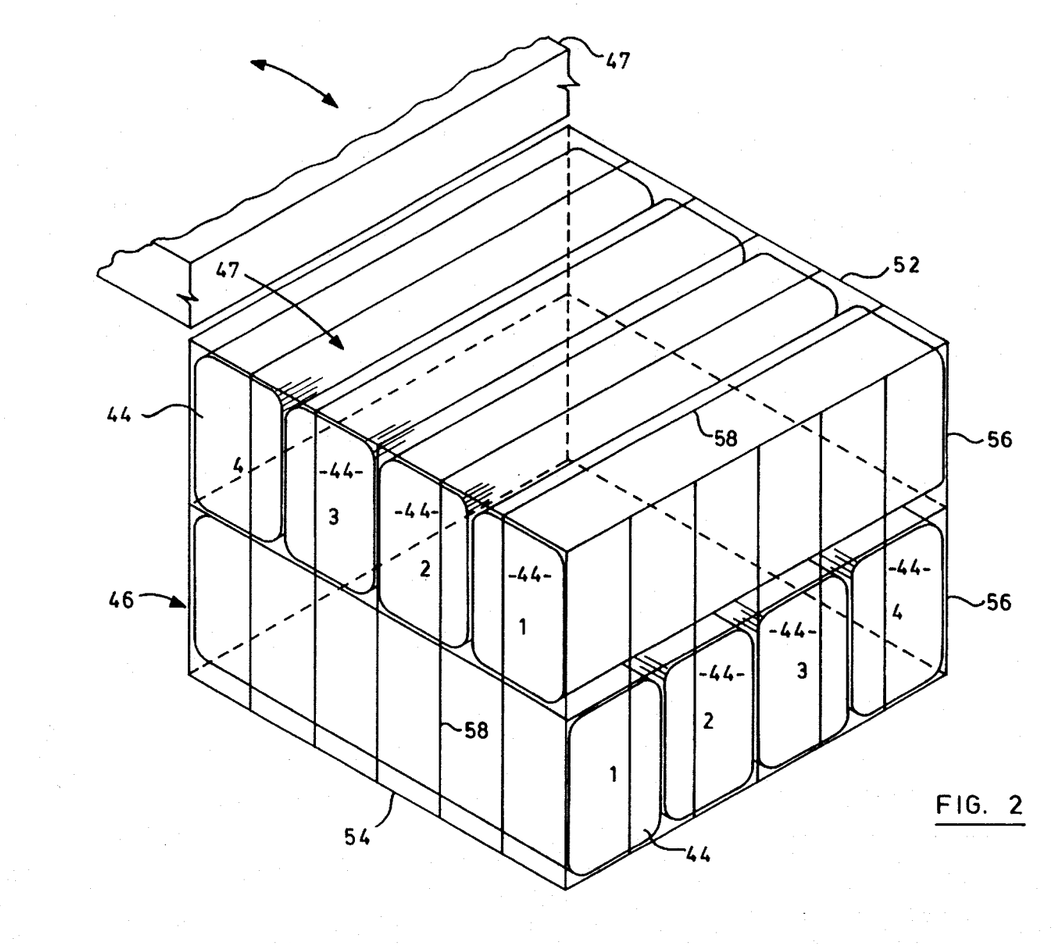
FIG. 2 is a perspective view of a portion of a biofilter used in the system of FIG. 1.
Figure 3:
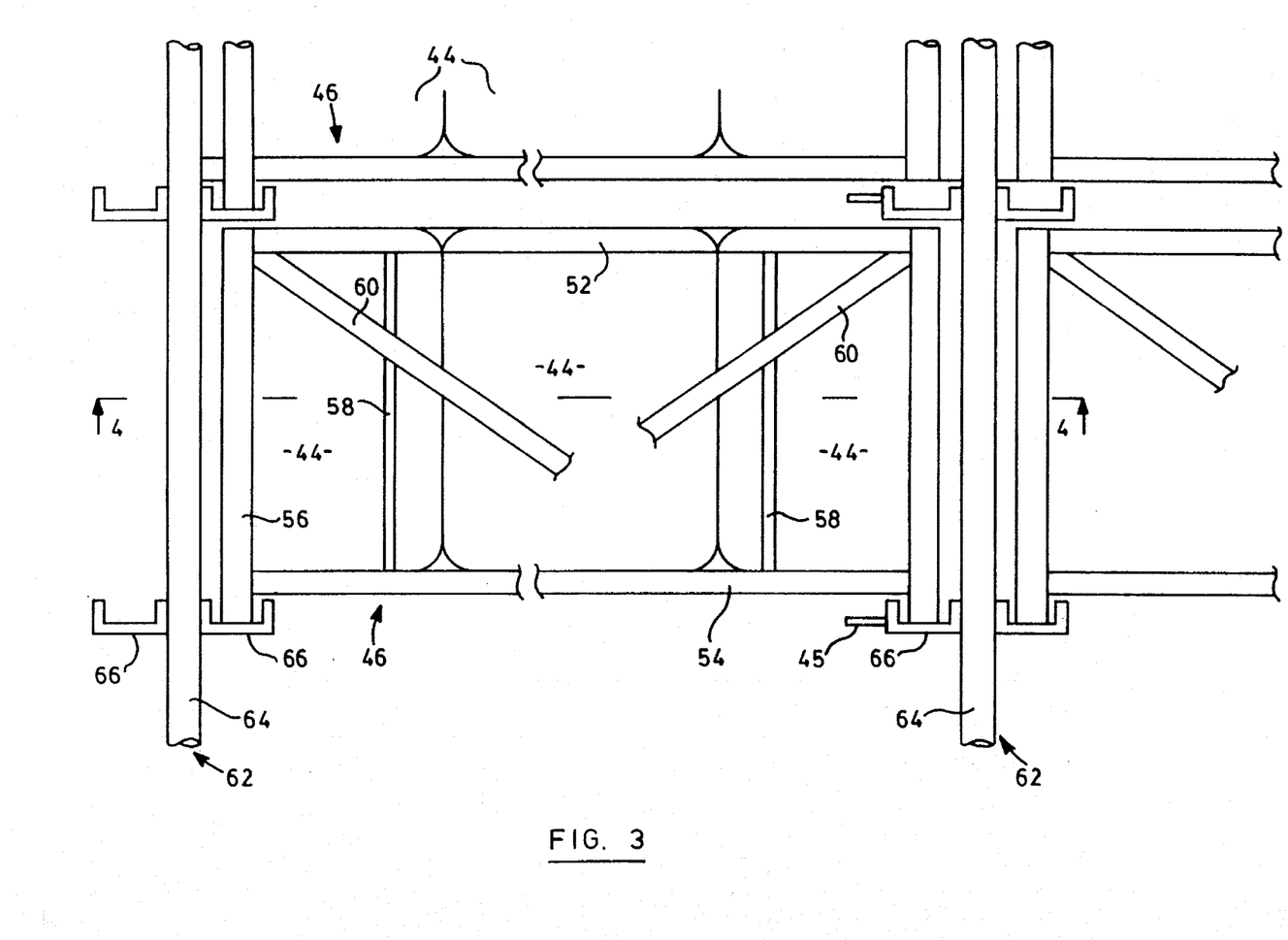
FIG. 3 is a side view of a frame used in the biofilter of FIG. 2.

Referring therefore to FIGS. 1 to 3 a waste treatment system generally indicated to by reference numeral 10 receives influent through a pipe 12 which is stored in a surge tank 14. A pump 16 under the control of a float valve 18 transfers influent from the surge tank to an array 20 of reactors 22. In the specific embodiment, the array 20 is provided by two parallel banks 24, 26 of reactors 22. The banks 24, 26 are connected to operate in series and with a corridor 25 between them. Each bank 24,26 in turn has two rows of reactors 22 with the reactors 22 in each row connected in series so that influent will pass through one row of reactors of each bank before being discharged as effluent. The rows in each bank therefore operate in parallel to divide the effluent flow. Other configurations are of course possible.

Each of the reactors 22 is supported over a respective sump 28, which collects fluid flowing through the reactors 22. Pumps 34 in each of the sumps 28 transfer the collected fluid to a spray head 35 over each of reactors 22 for further treatment.

Effluent from the sumps 28 discharge over a weir 36 and through a flocculating filter 38 into a holding tank 40. Effluent is discharged from the holding tank through a pipe 42. Influent from the pipe 12 is thus passed through a succession of filters 22 until the required quality of effluent is achieved.

Each of the reactors 22 is formed from stacks of filter modules 47 each of which includes filter elements 44 which are retained within a frame indicated to by reference numeral 46. The filter elements 44 are similar in construction and will be described further below. An air supply manifold 45 having an outlet between each filter module 47 is also incorporated within each reactor 22 to ensure a sufficient supply of oxygen for aerobic operation.

It will be noted from FIG. 2, that the filter elements 44 within each filter module 47 extend laterally in side-by-side relationship and abut one another along opposed surfaces. The filter elements 44 in each filter module 47 are oriented orthogonally to the elements immediately above or below, that is the axis of the filter elements alternate from level to level, and thus avoids a direct path through the reactors 22.

Each of the elements 44 is formed from a fragmented plastic, typically waste plastic which is shredded to provide a nominal size that provides a developed surface area of between 60 and 90 square feet per cubic feet. Typically, shredded strips of between 1½ and 3" wide provides the requisite range of densities and it is found that such strips shredded from curved articles such as bottles provide the requisite degree of compressibility and separation of developed areas.

Preferably for washed operation the plastic strips are hydrophilic to promote adherence of the effluent to the surface. Hydrophobic waste plastic may be treated with acid solutions to etch the surface and render it hydrophilic. In order to minimize intimate contact between flat surfaces that would reduce the developed area, it is preferred that closed curved loops of waste material are used, e.g. slices of a cylindrical bottle. Open-ended strips of material may be used provided they have sufficient inherent curvature and resilience to resist packing with other strips and to maintain their surfaces separated from adjacent strips.

Figure 6:
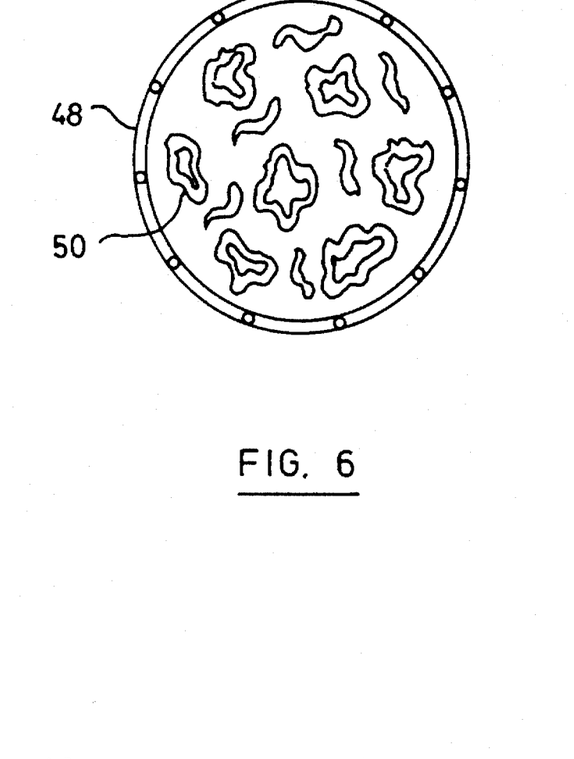
FIG. 6 is an end view of a filter element.
Figure 7:
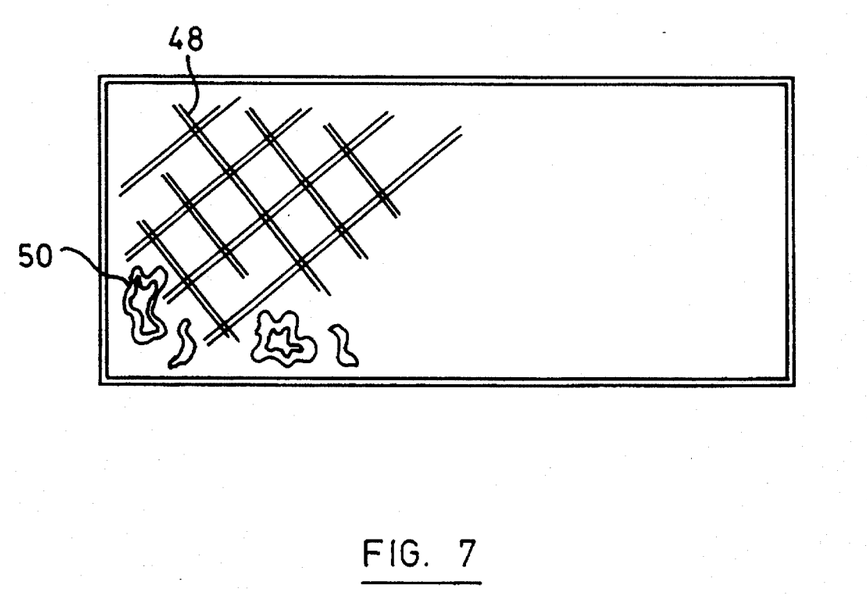
FIG. 7 is a side view of a filter element.

After shredding, the waste plastic is assembled into the filter elements as shown in FIGS. 6 and 7 by forming a cylindrical outer sleeve 48 of plastic mesh that typically has a nominal size of 2". Shredded plastic strips 50 are located within the sleeve 48 to provide a random, non-oriented medium with the ends of the sleeve 48 folded over to contain the plastic strips 50. The sleeve 48 contains sufficient of the strips 50 to provide the required developed surface area for the volume of the sleeve with variations of the density being provided within the reactor vessel. The plastic strips are compressed from their free body shape within the sleeves 48 with a 3:1 compression ratio being typical. Compression ratios of between 2:1 and 4:1 appear to be suitable to provide the requisite developed area within the filter elements 44 and still maintain separation of the surfaces.

The filter elements 44 are contained within frame 46 which as can be seen from FIG. 3 includes an open framework with top and bottom rails 52,54 and corner posts 56. Intermediate bars 58 extend between the top and bottom rails 52,54 at intervals and diagonal braces 60 provides rigidity for the frame work.

Figure 5A:
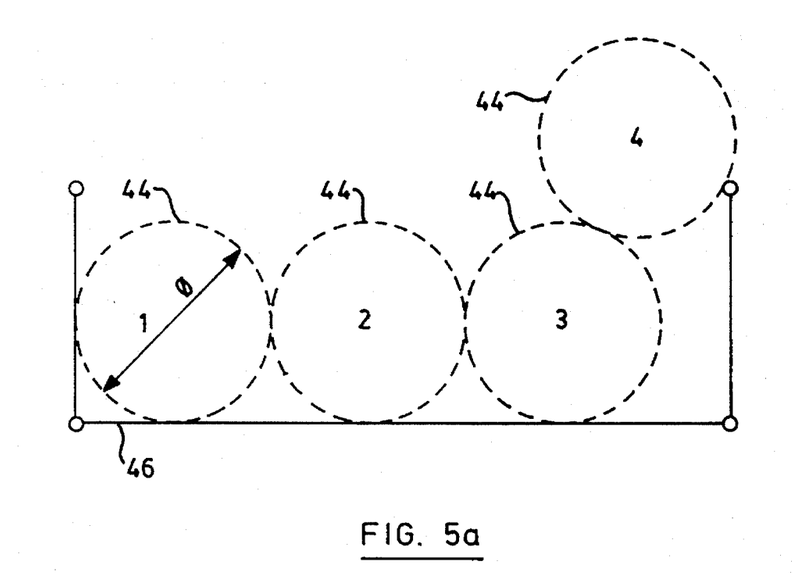
FIGS. 5a and 5b show the assembly of the biofilter utilizing the frame of FIG. 3.
Figure 5B:
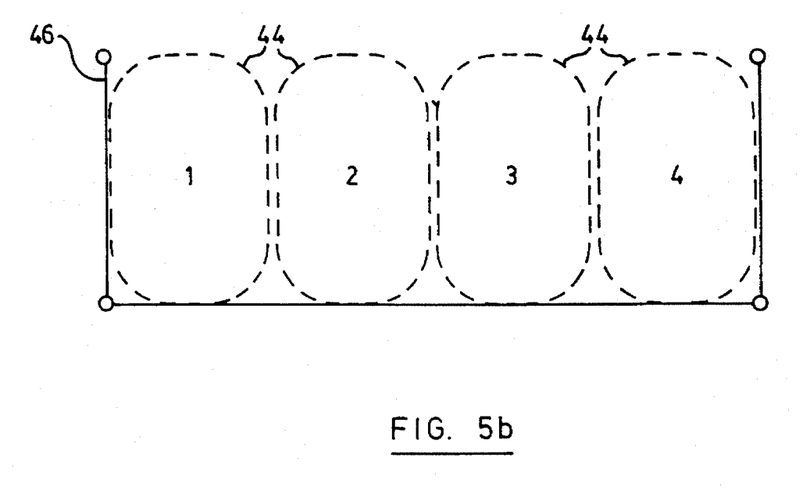

The sleeves 48 are flexible but substantially inelastic and are dimensioned to provide a snug fit of the filters elements 44 within the filter module 47. The plastic strips 50 within sleeve 48 are sufficiently compressible that the cross-section of the sleeve may be changed from circular as shown in FIG. 5a to generally rectangular as shown in FIG. 5b. The compression of the filter elements 44 ensures a close abutment along the opposed edges of the sleeves to provide a reasonably homogenous filter bed for the effluent within each frame 46.

Figure 4:
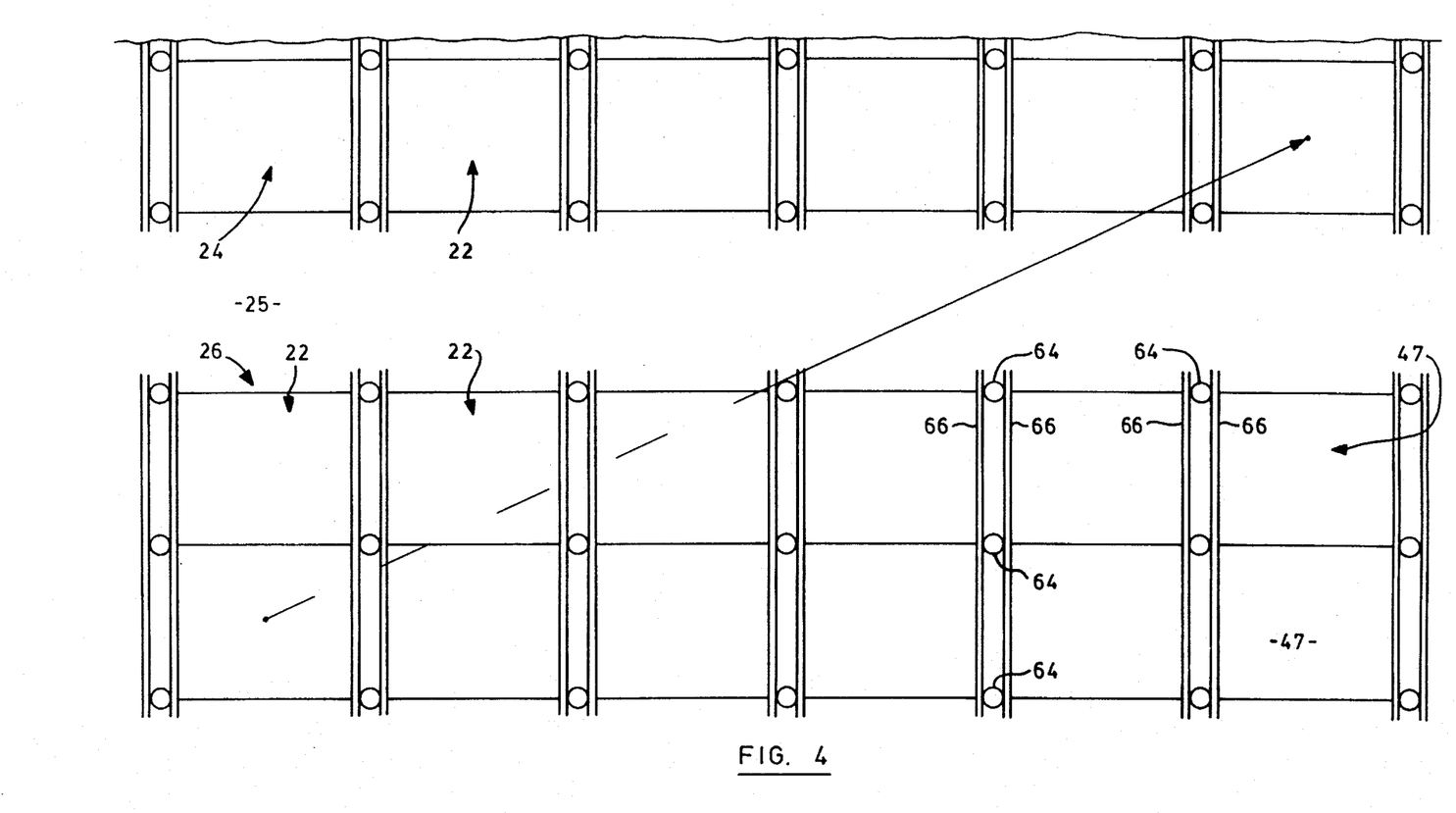
FIG. 4 is a view on the line 4–4 of FIG. 3.

Each of the reactors 22 are formed from stacks of frames 46 that are supported in a structural framework 62 (FIGS. 3 and 4). The framework 62 includes vertical pillars 64 that support rails 66. The lower end of each of the corner posts 56 is slidably supported in the rails 66 so as to be laterally movable relative to the adjacent frames 46. Accordingly, each filter module 47 may be slid laterally into the corridor 25 so that the filter elements 44 may be serviced without interruption of the filtration process.

As noted above, the strips 50 may be packed within the sleeves 48 to provide different surface areas for a given volume. Accordingly, the filter elements may conveniently progressively increase in density and developed area from the top of each reactor towards the bottom to provide a progressive filtering action upon the effluent. Typically, the filter elements 44 in the upper frames 46 will have a developed area of 60 ft$^2$ per ft$^3$ progressively increasing to 90 ft$^2$ per ft$^3$ at the lower level.

In operation, therefore, the effluent is progressively passed through the reactors 22 where it passes from top to bottom through the filter elements 44. The plastic strips 50 within the elements 44 provide the requisite developed surface for anaerobic or aerobic action with progressively increasing density of filter medium. The effluent received in each sump 28 is either recycled through the same reactor or passed to the next reactor until it progresses to the effluent pipe 42.

If it becomes necessary to service the filter elements 44, the frame 46 may be slid on the rails 66 out of the reactors 22 to provide access to the filter elements 44. In so doing, however, the reactors 22 may continue to operate although with reduced efficiency due to the removal of one of the filter modules. The filter elements 44 may then be removed from the frame 46 for cleaning or replacement and the refurbished filter module returned to the reactor once service is complete.

Figure 8:
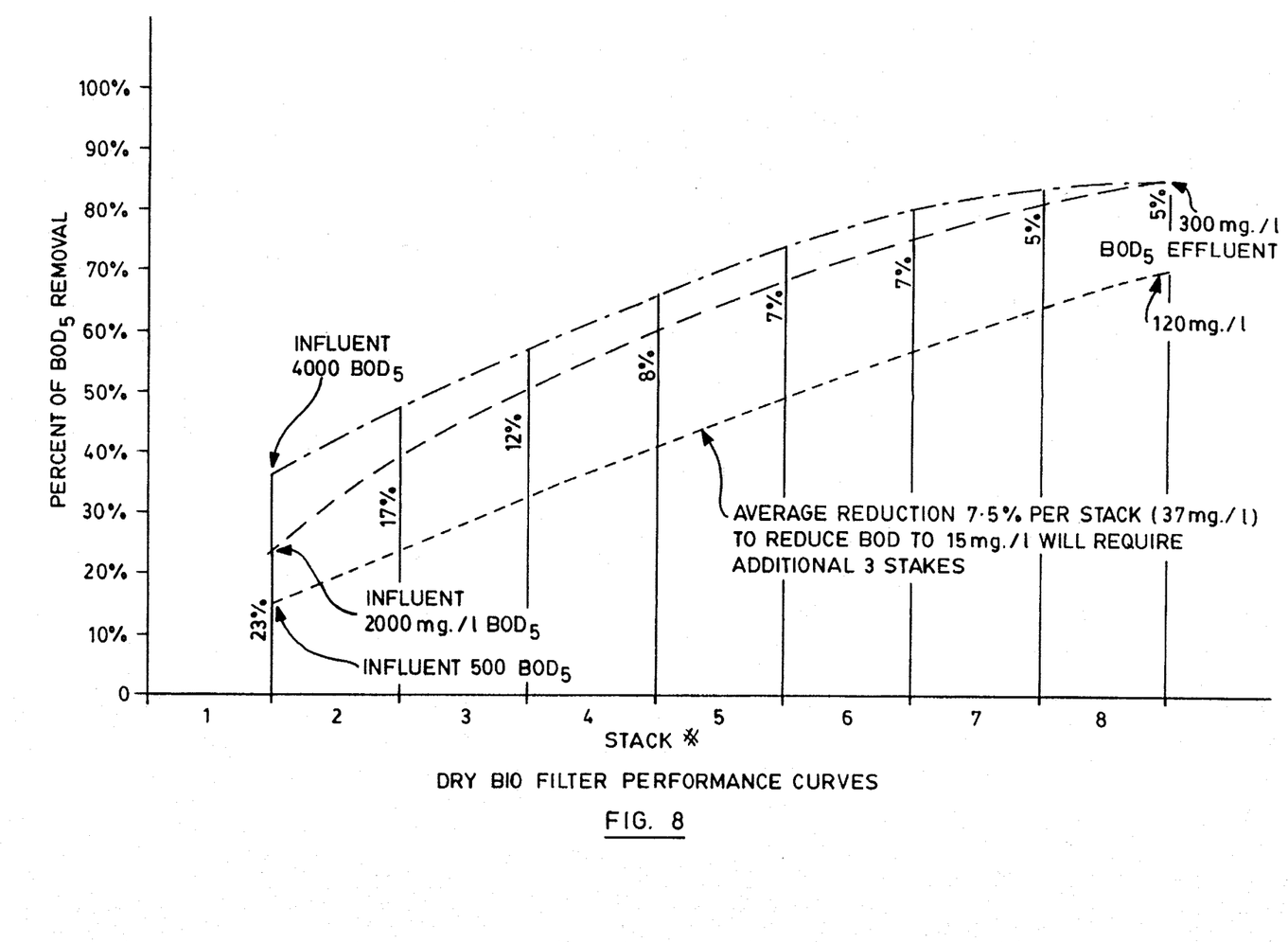
FIG. 8 is a curve illustrating the performance of a waste water treatment system.

The modular construction of the reactor 22 also permits the performance of the waste treatment facility to be adjusted to the particular needs. As seen in FIG. 8, the percentage of BOD$_5$ removed by each reactor is in the range of 7.5% after initial removal in the first reactor. This performance is obtained for a reactor having 5 filter modules 47 each of nominal size 6.0 ft. by 6.0 ft. by 2.0 ft. and with a developed area of between 60 and 90 ft$^2$ per ft$^3$. Obviously, additional filter modules could be added to each reactor, or additional reactors added to each bank or additional banks added as is most appropriate if additional removal is required.

The reactors may be operated in a washed or "dry" mode, as shown in FIG. 1, or may be operated in a submerged or "wet" mode as required. When operating in the dry mode, air may be supplied through the manifold 45 to promote the aerobic action on the developed surfaces. The amount of air supplied will depend upon the particular operating conditions of each reactor and may be adjusted to suit.

The use of the waste plastic strips 50 provides an extremely economical filter medium and is found to have the necessary developed surface area per unit volume. The inherent curvature found in many waste products ensures that the adjacent services of the strips remain separate to thereby maintain the required surface area. Adjustment of the compression ratio and/or the shredding size will also adjust the developed surface area within each filter element. Accordingly, it will be seen that a simple yet effective reactor is provided that may be adapted in many configurations to suit the particular needs.

I claim:

1. A reactor vessel for the treatment of fluid waste comprising:

a frame;

a plurality of filter elements contained within said frame each of which includes a flexible porous outer sleeve and filter medium contained by said sleeve, said filter medium being formed from fragmented plastic and being compressible to permit flexure of said sleeve, said filter elements being arranged side by side and in abutment with longitudinal axes of each filter element being generally parallel, said filter elements having a free body width greater than the width of said frame and being fitted within said frame by flexure of said sleeves.

2. A reactor vessel according to claim 1 wherein said fragmented plastic is curved and is inherently resilient to maintain adjacent surfaces of said fragmented plastic separated.

3. A reactor vessel according to claim 2 wherein said fragmented plastic is compressed from its free body shape into said outer sleeve.

4. A reactor vessel according to claim 3 wherein said fragmented plastic is compressed to a volume of between ½ and ¼ of its free body shape.

5. A reactor vessel according to claim 4 wherein said fragmented plastic has a developed surface of between 60 ft$^2$/ft$^3$ and 90 ft$^2$/ft$^3$.

6. A reactor vessel according to claim 3 wherein said sleeve is flexible and inelastic.

7. A reactor vessel according to claim 6 wherein said sleeve is an open mesh.

8. A reactor vessel according to claim 3 wherein said fragmented plastic is compressed to a volume of ⅓ of its free body shape.

9. A reactor vessel according to claim 2 wherein said fragmented plastic is formed as closed loops.

10. A reactor vessel according to claim 1 wherein said filter medium has a developed surface of between 60 ft$^2$/ft$^3$ and 90 ft$^2$/ft$^3$.

11. A reactor vessel according to claim 1 wherein said fragmented plastic has a hydrophilic surface.

12. A reactor vessel having a plurality of filter modules arranged in seriatim along an effluent flow path, each of said filter modules having a plurality of elongate filter elements with longitudinal axes disposed normal to said flow path, the longitudinal axes of filter elements in adjacent filter modules being orthogonal to one another to provide a substantially homogeneous filter medium in vessel.

13. A reactor vessel according to claim 12 wherein each filter module includes a frame to contain said filter elements, said frame being dimensioned to hold said filter elements in a flexed condition to cause abutment of adjacent filter elements.

14. A reactor vessel according to claim 13 wherein each of said filter elements includes a flexible outer sleeve and a flexible filter medium within said sleeve.

15. A reactor vessel according to claim 14 wherein said filter medium is formed from fragmented plastic and is compressible to permit flexure of said sleeve.

16. A reactor vessel according to claim 15 wherein said filter medium has a developed surface of between 60 ft$^2$/ft$^3$ and 90 ft$^2$/ft$^3$.

17. A reactor vessel according to claim 16 wherein said fragmented plastic is curved and is inherently resilient to maintain adjacent surfaces of said fragmented plastic separated.

18. A reactor vessel according to claim 17 wherein said fragmented plastic is formed as closed loops.

19. A reactor vessel according to claim 14 wherein said outer sleeve is flexible and inelastic.

20. A reactor vessel according to claim 19 wherein said filter elements have a free body width greater than the width of said frame, said filter elements being fitted within said frame by flexure of said sleeve.

21. A reactor vessel according to claim 20 wherein said fragmented plastic has a developed surface of between 60 ft$^2$/ft$^3$ and 90 ft$^2$/ft$^3$.

22. A reactor vessel according to claim 13 wherein said fragmented plastic has a developed surface of between 60 ft$^2$/ft$^3$ and 90 ft$^2$/ft$^3$ and inelastic.

23. A rector vessel according to claim 12 wherein each of said filter modules is selectively removable from said reactor vessel.

24. A reactor vessel according to claim 23 wherein said filter module is removable in a direction normal to said flow path.

25. A reactor vessel according to claim 12 wherein each of said filter elements is flexible and abuts an adjacent filter element along one side.

* * * * *